Figure 1:
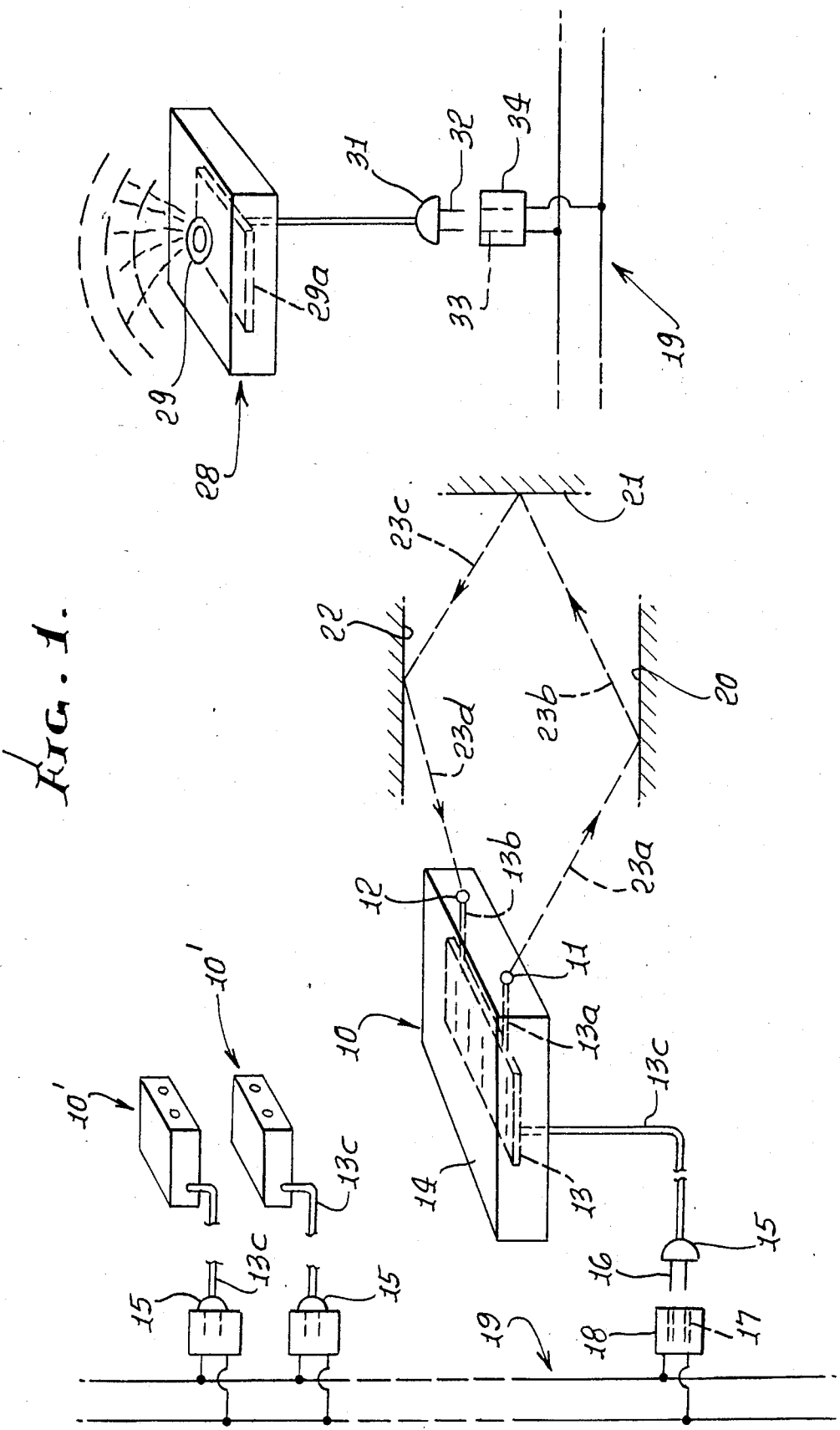

United States Patent [19]

Idland

[11] Patent Number: 4,807,255
[45] Date of Patent: Feb. 21, 1989

[54] ALARM SYSTEM RESPONSIVE TO INTRUSION INDUCED PHASE UNBALANCE

[76] Inventor: Carsten H. Idland, 3450-B Mountain View, Los Angeles, Calif. 90066

[21] Appl. No.: 87,510

[22] Filed: Aug. 19, 1987

[51] Int. Cl.[4] .......................... G08B 13/16; G08B 1/08
[52] U.S. Cl. ...................................... 367/93; 340/538; 367/94
[58] Field of Search ...................... 367/93, 94; 340/538

[56] References Cited

U.S. PATENT DOCUMENTS

| | | | |
|---|---|---|---|
| Re. 30,288 | 5/1980 | Hackett | 340/554 |
| 3,394,342 | 7/1968 | Walker | 367/93 |
| 3,631,433 | 12/1971 | Dix | 340/533 |
| 3,665,443 | 5/1972 | Galvin | 367/94 |
| 3,727,216 | 4/1973 | Antonio | 367/94 |
| 3,801,978 | 4/1974 | Gershberg et al. | 367/94 |
| 3,846,778 | 11/1974 | Galvin et al. | 367/94 |
| 3,924,254 | 12/1975 | Klebold et al. | 340/566 |
| 3,925,773 | 12/1975 | Green | 367/94 |
| 4,149,157 | 4/1979 | Guennou | 340/554 |
| 4,225,858 | 9/1980 | Cole et al. | 340/554 |
| 4,290,056 | 9/1981 | Chow | 340/538 |
| 4,319,228 | 3/1982 | Daniels | 340/521 |
| 4,358,756 | 11/1982 | Morel et al. | 340/539 |
| 4,485,374 | 11/1984 | Meserow et al. | 340/541 |

*Primary Examiner*—Glen R. Swann, III
*Attorney, Agent, or Firm*—William W. Haefliger

[57] ABSTRACT

An alarm system includes apparatus to be placed in a room to transmit ultrasonic wave signals that rebound off the room's walls and contents, to, and receive the rebounding signals, and to phase balance the transmitted and received signals in order to detect a subsequently unbalance condition caused by a changed in the rebounding signals due to intrusion activity, which produces an electrical alarm signal. Other circuitry responds to reception of an alarm signal to produce an audible or visible alarm. The alarm signal is typically transmitted over electrical power lines.

11 Claims, 4 Drawing Sheets

MASTER CONTROLLER

SENSOR UNIT

SIREN UNIT

ALARM SYSTEM RESPONSIVE TO INTRUSION INDUCED PHASE UNBALANCE

BACKGROUND OF THE INVENTION

This invention relates generally to automatic alarm system, as for example are used in the home, or in other buildings, and more particularly concerns on alarm system which is portable, i.e. easily moved about to locations where needed.

It is well known that reliable, low cost room intrusion detection alarm systems are in great need, i.e. there is a large market for adequate low cost, reliable alarm systems of this type.

SUMMARY OF THE INVENTION

It is a major object of the present invention to provide a highly advantageous system meeting the above need, and characterized by
 (a) portability,
 (b) low cost,
 (c) reliability,
 (d) simplicity,
 (e) adaptation for use with electrical power lines,
 (f) easy and rapid adjustment in local, positioning of the alarm unit relative to the localized zone wherein an intrusion is to be detected,
 (g) easy and rapid change in positioning of the zone wherein an intrusion is to be sensed,
 (h) modularity Basically, the system comprises:
 (a) first sensor means to be placed in a room, and to
  (i) transmit ultrasonic wave signals that rebound off room wall structure, and
  (ii) receive the rebounding ultrasonic signals,
 (b) circuit means to phase balance the transmitted and received signals; to detect a subsequently unbalanced condition caused by a change in the rebounding signals due to intrusion activity, and to produce an electrical alarm signal,
 (c) and other means responsive to reception of the alarm signal to produce an audible or visible alarm.

More specifically, the sensor unit or means typically includes:

A detection device and a status power line carrier transmission device. The detection device typically uses ultrasonics in order to detect the presence of an intruder, and includes a transmitter and a receiver. Upon setting the alarm, the transmitter sends out an ultrasonic signal which bounces off the environment and returns to the receiver. The phase shift at which the receiver detects the ultrasonic signal becomes the baseline. Any change in the phase shift received indicates a change in the room acoustical configuration such as a window being broken or a person passing through the room. This change in baseline results in power line alarm signal transmission, i.e. produced with a signature which identifies it uniquely with respect to background noise and possibly other modules within the system. The sensor unit typically regularly transmits a status signal which can be detected by a master controller and used to determine if any tampering (i.e. unplugging of a sensor) is taking place, The siren or alarm means typically includes an audible siren and a power line carrier transmission device. It receives a status signal from the master controller which dictates whether the siren should be turned on or not. Interruption of the master controller status signal and/or the transmission of an alarm signal by the master controller or sensor unit indicates to the siren circuitry that the siren should be sounded. Entry and exit delays allow for the ability to get to and from the master controller without setting the alarm off, The master controller may be provided to include a key pad to allow entry of a code to arm and disarm, a time delay circuit which allows for entry and exit delays and an automatic return to armed status after a period of time elapses between the indication of intrusion by the sensors and return of the sensors to a baseline. Other features which may be incorporated into the master controller include: phone hookup for purposes of remote interrogation and automatic dialing to police or security agencies to notify them of an intrusion. Also, a sensing device may be incorporated directly into the master controller unit as well as status lights for each sensor.

These and other objects and advantages of the invention, as well as the details of an illustrative embodiment, will be more fully understood from the following specification and drawings, in which:

DRAWING DESCRIPTION

Figure 2:
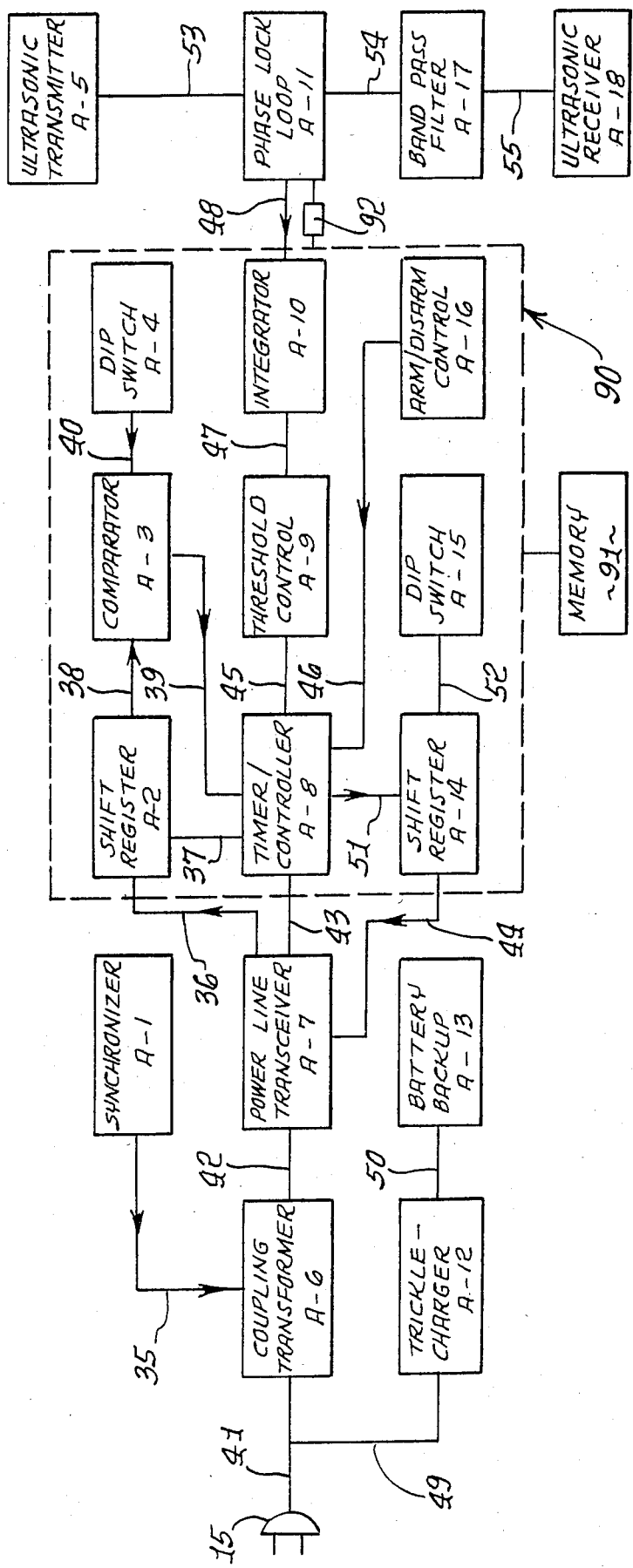
Figure 3:
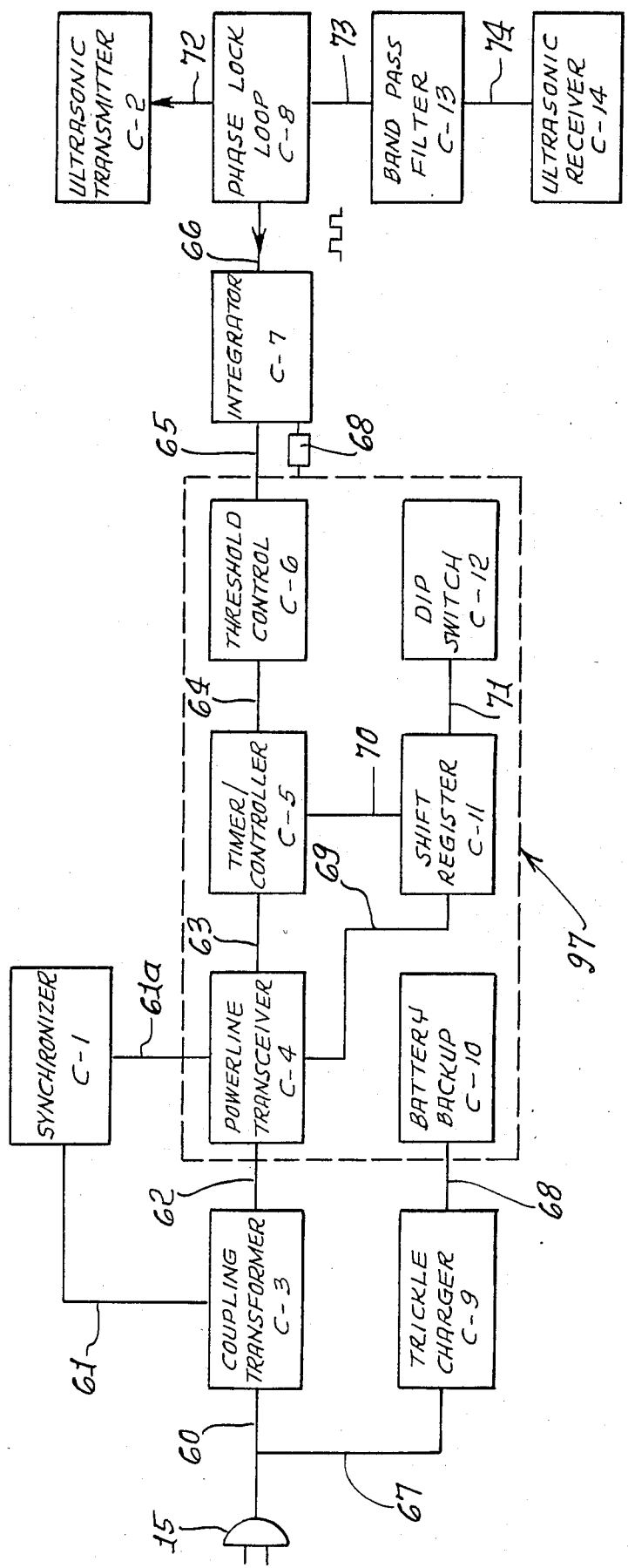
Figure 4:
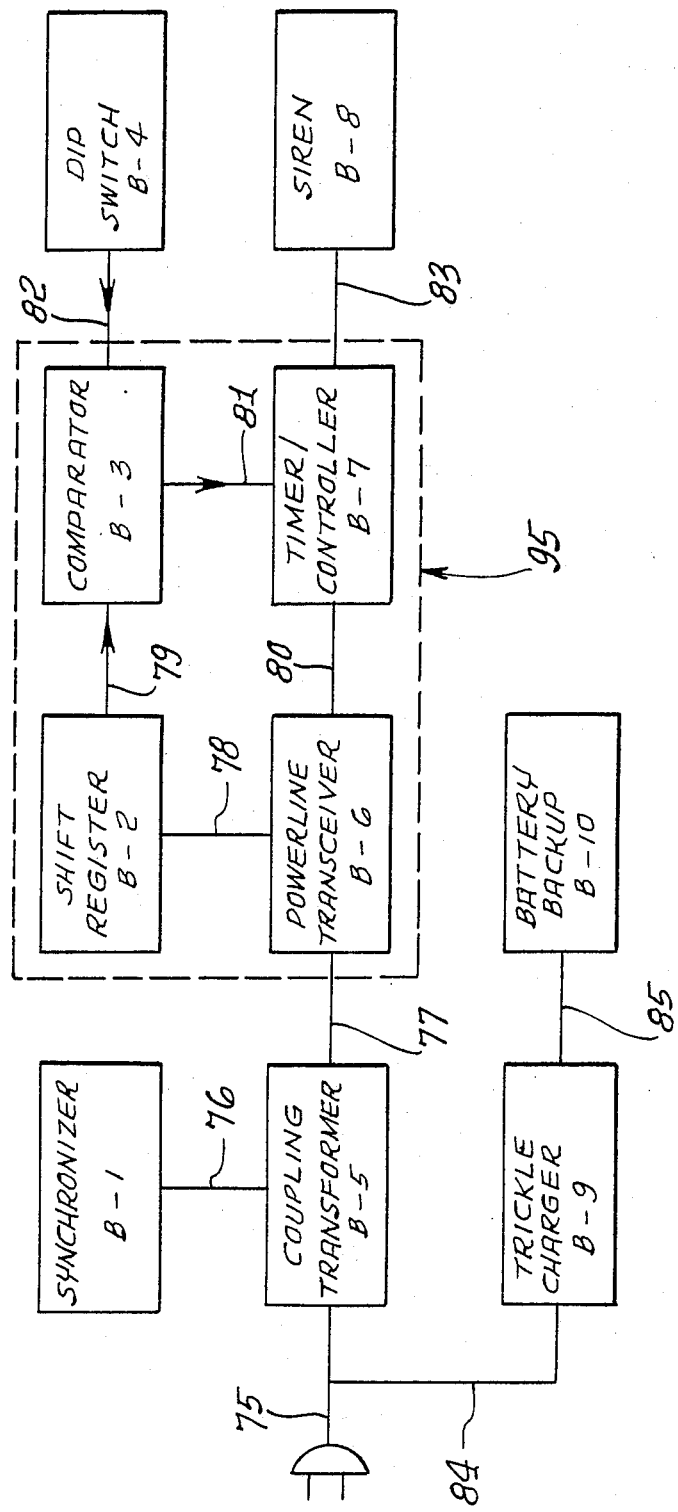

FIG. 1 is a system diagram, in perspective, and
FIGS. 2-4 Are block circuit diagrams of components of the system.

DESCRIPTION OF THE PREFER RED EMBODIMENTS

GENERAL DESCRIPTION

In accordance with the alarm system of the invention, and referring first to FIG. 1, first means is provided to be placed in a room, and to (i) transmit ultrasonic wave signals that rebound off room wall and window structure, and/or other structure in or associated with the room (or chamber), and to (ii) receive the rebounding ultrasonic signals. Such a first means is indicated at 10, and as incorporating a first transducer 11 that transmits the signals, and a second transducer 12 that receives the rebound signals. Transducer 11 and 12 can be one transducer, operated in timewise alternating transmit and receive modes.

Also provided is circuit means to phase balance transmitted and received signals, or signals corresponding to same; to detect a subsequently unbalanced condition caused by a change in the rebounding signals due to intrusion activity; and to produce an electrical alarm signal. Such a circuit means is shown at 13 as in the form of a circuit board within portable housing 14 that also carries the transducers 11 and 12. That circuit means is connected at 13a and 13b with the transducers, and also at 13c with an electrical connector 15 such as a plug having terminals 16 to be electrically connected to terminals 17 of an electrical connector, or receptacle 18 associated with a power line means. The latter is shown as including household AC power lines 19, for example. Thus, the means 10 can be carried from room to room, wherein intrusion detection is to be carried out. Room walls are indicated at 20, 21 and 22, and the path of a rebounding ultrasonic signal is shown at 23a—23d. Other rebounding signals are detected at 12. If one or more are changed, due to intrusion, the composite of the signals detected at 12 changes slightly in phase, and phase unbalance occurs in the circuitry 13. That unbalance results in production of an electrical alarm signal transmitted via 13c, 15, 16, 17 and on 19 as via a power line carrier frequency The ultrasonic motion detector typically utilizes two transducers, a receiver and a transmitter. The transmitter emits a continuous signal typically 40 kHz. The signals are reflected by the surfaces in the room and are picked up by the receiver. If there is no motion present the signals return in constant phase with respect to the transmitted signal. In the event of a change in one of the surfaces (a door or window opening) or a new surface's being introduced (someone entering the room), the phase of the received signal changes. This change can be detected and is used to trigger an alarm condition.

One way of comparing phase shifts is by using a phase lock loop. A typical chip used for the phase lock loop (PLL) is a 4046 chip. This chip includes an on board voltage controlled oscillator which produces the output frequency for the transmitter and the reference for the incoming signal from the receiver. The output from this chip is a square wave, the duty cycle of which is dependent on the degree of phase shift with respect to the incoming and outgoing signals.

Many various circuits may be built to be triggered with respect to the output of the PLL circuit. Conditioning of the output signal at this point to help reduce false alarms may be introduced.

The alarm signal (typically a digital code) is conditioned and inserted into the power lines through a coupling transformer. Conditioning of the signals is accomplished by creating a transmission frequency (amplitude shift keying ASK) or pair of frequencies (frequency shift keying FSK). The digital code is then converted to these frequencies typically between 50 and 300 kHz. The power line frequency is typically used as a reference for synchronization purposes. Other conditioning of the signal may be accomplished by using a sophisticated transmission chip, the LM1893.

Other means is also provided to be placed at a remote location (but accessible to power lines 19), to be responsive to reception of the alarm signal on the power lines, to produce an audible or visible alarm. Such other means is shown, for example, to include a portable housing means 28 carrying a generator 29 of an audible or visible signal, together with associated circuitry, as including board 29a in the housing. The circuitry also includes an electrical connector 31 (plug) having terminals 32 to be electrically connected to terminals 33 of an electrical connector 34 (receptacle or outlet) associated with the power lines 19. Elements 31 and 34 are ordinarily of household or commercial building type, whereby the portable housing 28 may be carried to a room or location (say an upstairs bedroom) where an alarm is visibly or audibly generated to be detected by an occupant, remote from the intrusion location (say, a downstairs room, in a home).

Reception of the alarm signal is typically accomplished by receiving the signal through a coupling transformer. The signal is then conditioned to bring it back to its original digital form. The digital code is then compared with the internal system code, and if the codes match an alarm condition is validated and further action is carried out by the particular device which receives the proper alarm code.

Various protocols may be used to increase the reduction of false alarms. One such method requires that the digital code be sent a number of times and must be received a certain number of times in order to reduce the possibility of an accidental code being received.

Additional and like sensor units 10', similar to master unit 10, may be employed in other rooms or chambers, and are indicated in FIG. 1. See also the discussion below.

Referring now to FIG. 2, unusually advantageous master control circuitry is shown, with elements corresponding to those discussed above generally at 11, 12, and 15. Elements A-1 to A-18 are illustrated, with interconnections at 35-55, as indicated.

MASTER CONTROLLER

The basic function of the master controller is to control the operation of the entire system. The master controller however may include an ultrasonic sensor device so that a complete system may have just the master controller and a siren unit.

The phase lock loop (A-11 block may comprise a 4046 chip which carries on board a voltage controlled oscillator. This circuit outputs a frequency (typically around 40 kHz) from its VCO which is then outputted through the ultrasonic transmitter (A-5). The signal is reflected back from the various surfaces it encounters in a typical room and received by the ultrasonic receiver (A-18). The signal is then sent at 54 to the band pass filter whose center frequency is the same as the output of the VCO. The incoming frequency is then compared with respect to that of the VCO. The PLL circuit outputs a square wave whose duty cycle is dependent on the amount of phase mismatch between outgoing and incoming signals.

The output of the PLL circuit is transmitted at 48 to the integrator circuit (A-10) which monitors the output. A series of Schmitt triggers may compose this circuit and the threshold circuit (A-9). A large enough change in duty cycle will trigger a response and continue to do so until the signal again becomes constant. The amount of time this circuit is being triggered may be accumulated by use of a resistor-capacitor circuit. Once the accumulated time response has reached a certain level the threshold control circuit (A-9) responds and sends a signal to the timer/control circuit (A-9) that an alarm condition exists.

The time controller circuit (A-8), typically consists of timing and switching circuits. Under non-alarm conditions it transmits a suppress alarm code into the power lines periodically, while normally keeping the power line transceiver A-7 in the receive mode. This is accomplished by the normal state timer which periodically switches the transceiver to transmit mode and causes the shift register (A-14) to send its data code to the transceiver. The shift register (A-14) is of the parallel to serial type and receives its information from the DIP switch (A-15). The DIP switch provides a changeable digital code by means of a series of on/off switches. The timer controller in this unit also includes entry and exit delay timers. The exit delay timer is set into action by the arm/disarm control. This timer allows an adjustable period of time to exit the secured area after the system has been armed without the system responding to detected motion. The entry delay timer allows and adjustable period of time to enter a code to disarm the system before the siren unit is activated due to the intrusion.

The arm/disarm control A-16 controls the response of the timer controller to alarm conditions. In the disarmed state alarm conditions are ignored. The system is armed and disarmed by keying in the proper code on a numeric keyboard.

In the event of an alarm condition, the suppress alarm code is not transmitted and an alarm code signal may be sent to the alarm or siren unit via the power lines. The alarm timer is envoked in case of an alarm condition. If no further alarm signals are received the alarm timer returns control after a period of time to the normal state timer and which again begins to send the suppress alarm codes.

In the event a sensor unit (See FIG. 3) transmits an alarm signal to the master controller it receives it through the transceiver A-7, sending the signal to the serial to parallel shift register (A-2). The comparator (A-3) then compares the data received with the data from the dip switch (A-4); if a match occurs the comparator sends an alarm condition signal at 39 to the timer/controller circuit. To achieve greater integrity of data, transmission signals may be sent for example six times and must be received at least four times before action is taken.

The power line transceiver circuit A-7 may consist of National Semiconductor Corporation's LM1893 Power Line Transceiver chip and some discrete components. This chip provides reliable serial data transmission through power lines by means of supplying sophisticated data transmission techniques.

The synchronizer (A-1) serves as the system clock. It is synchronized with respect to the power line frequency and operates at some multiple of 60 Hz (360 Hz typical). Clock synchronization allows all system modules to be in synch with each other which makes data transmission simpler.

The coupling transformer (A-6) provides a means for the transceiver to communicate with the power lines yet remain isolated from them.

Included in this system is a battery backup system composed of a trickle charger (A-12) and a battery (A-13).

The system described is one version of how this system may appear. A microprocessor based system would alleviate the need for many of the components listed here. The microprocessor could, for example, combine in its operations the shift registers, the comparator, the timer/controller, the threshold control, the integrator, and the arm/disarm control circuits with fewer components. Such a microprocessor is indicated by broken line block 90, with associated memory circuit 91. Signal conditioner 92 connects A-11 with 90.

SENSOR UNIT

The sensor unit shown in FIG. 3 enables an additional area to be protected against intrusion.

The phase lock loop (C-8) block may be a 4046 chip which carries on board a voltage controlled oscillator. This circuit outputs a frequency (typically around 40 kHz) from its VCO which is then outputted through the ultrasonic transmitter (C-2). The signal is reflected back from the various surfaces it encounters in a typical room and received by the ultrasonic receiver (C-14). The signal is then sent to the band pass filter whose center frequency is that of the VCO. The PLL circuit outputs a square wave whose duty cycle is dependent on the amount of phase mismatch between outgoing and incoming signals.

The output of the PLL circuit is transmitted at 66 to the integrator circuit (C-7), which monitors the output. A series of Schmitt triggers may compose this circuit and the threshold circuit (C-6). A large enough change in duty cycle triggers a response and continues to do so until the signal again becomes constant. The amount of time this circuit is being triggered may be accumulated by use of resistor-capacitor circuit. Once the accumulated time response has reached a certain level, the threshold control circuit (C-6) responds and transmits at 64 a signal to the timer/control circuit (C-5) indicating that an alarm condition exists.

The timer/controller circuit (C-5) includes timer and switching circuits. In the event an alarm signal is introduced to the timer/controller circuit, it switches the power line transceiver C-4 into transmit mode and also transmits at 70 a send data command to the shift register (C-11). The shift register (C-11) is of the parallel to serial type and receives its information from the DIP switch (C-12). The DIP switch provides a changeable digital code by means of a series of on/off switches. To achieve greater integrity of data transmission, signals may be sent for example six times and must be received at least four times before action is taken.

The power line transceiver circuit may be composed of National Semiconductor Corporations's LM1893 Power Line Transceiver chip and some discrete components. This chip provides reliable serial data transmission through power lines by means of supplying sophisticated data transmission techniques.

The synchronizer (C-1) serves as the system clock. It is synchronized with respect to the power line frequency and operates at some multiple of 60 Hz (typically 360 Hz). Clock synchronization allows all system modules to be in synch with each other which makes data transmission simpler.

The coupling transformer (C-3) provides a means for the transceiver to communicate with the power lines yet remain isolated from them.

Included in this system is a battery backup system composed of a trickle charger (C-9) and a battery (c-10).

The system described is one version of this how this system may appear. A microprocessor based system would alleviate the need for many of the components listed here. The microprocessor could for example combine in its operations the shift registers, the comparator, the timer/controller, the threshold control, the integrator, and the arm/disarm control circuits with fewer components. One additional desirable feature would allow the remote interrogation of the sensor unit by the master controller. This could be accomplished by the master controller sending a report command to the sensor unit which then in turn sends a code back which may or may not be different than its unique alarm code.

One such microprocessor is indicated by broken line block 97, with a signal conditioner circuit 98 connected between C-7 and 97.

SIREN ALARM UNIT

Elements of this unit (corresponds to means 28, 29 and 29a) are indicated in FIG. 4 at B-1 to B--10, with interconnections at 75-85.

The coupling transformer (B-5) provides a means for the transceiver to communicate with the power line yet remain isolated from them.

The synchronizer (B-1) serves as the system clock. It is synchronized with respect to the power line frequency and operates at some multiple of 60 Hz (typically 360 Hz). Clock synchronization allows all system modules to be in synch with each other which make data transmission simpler.

Included in this system is a battery backup system composed of a trickle charger (B-9) and a battery (B-10).

The power line transceiver circuit may be composed of National Semiconductor Corporation's LM1893 power Line Transceiver chip and some discrete components. This chip provides reliable serial data transmission through power lines by means of supplying sophisticated data transmission and reception techniques. In the siren unit the transceiver is always in the receive mode.

The timer/controller circuit (B-7) consists of various timers and switching circuits. Under non-alarm conditions it receives a suppress alarm code from the master controller unit, via the power lines. The siren unit receives the signal through the transceiver which sends the signal to the serial to parallel shift register (B-2). The comparator (B-3) then compares the data receive with the data from the dip switch (B-4); if a match occurs, the comparator sends a safe condition signal to the timer/controller circuit (B-7). This signal resets the alarm timer and keeps the siren (B-8) from sounding.

In the event of an alarm condition, the suppress alarm code is not transmitted and an alarm code signal may be or is sent to the siren unit. If the alarm timer is not reset, the siren will sound until it receives a suppress alarm code.

The system described is one version of this how this system may appear. The protocol of data transmission may vary. For example, instead of having a timer constantly needing resetting as a way of protecting the siren unit from being left defenseless if unplugged, it may wait for an alarm signal to set it off. In the event of power failure or unplugging it sends out its own signal to the master controller to determine if conditions have changed. If no response is received, the siren unit sounds off, i.e. activates. A microprocessor based system would alleviate the need for many of the components listed here and also allow for greater complexity of operations. The microprocessor could for example combine the operations of the shift registers, the comparator, the dip switch, the timer/controller, with fewer components. Such a microprocessor is indicated by broken line block 95.

COMPONENT DESCRIPTIONS

Coupling Transformer—This transformer enables the communication of signals in and out of the power lines.

Trickle Charger—Supplies backup battery.

Backup Battery—In case of accidental or intentional power loss.

Powerline Transceiver—A Circuit which enables reliable communication with other modules. An example of such a circuit would use the LM1893 Carrier Current Transceiver with only a few discrete parts.

Timer/Controller—Controls timing sequences and also the communication status of the transceiver and shift registers. Enables various protocols to be used with respect to communication between modules and data checking.

Shift Register—Enables digital information to be converted from serial to parallel and vice-a-versa. The shift register also has the ability to send or receive data.

Comparator—Compares data received by the shift register to the code setting on the dip switch.

Dip Switch—A series of on/off switches in a dual in-line pin package. Used in this circuit to provide a means of forming an alterable digital code.

Trigger Control—Sends an alarm condition signal when the integrator has reached a predetermined level.

Integrator—This circuit is used to accept signals from the phase lock loop circuit and accumulates the magnitude of phase change response with respect to time. This circuit in conjunction with the trigger circuit reduces false alarms due to change in air currents or possibly small falling objects.

Phase Lock Loop—A circuit which compares the phase of the transmitter and receiver. This circuit outputs a square wave whose duty cycle is dependent on the phase difference. A typical chip which incorporates these features is the 4046.

Band Pass Filter—This circuit filters out frequencies which are outside of the useful range.

Ultrasonic Transmitter—This element outputs a continuous ultrasonic (typically 40 kHz).

Ultrasonic Receiver—This element receives the reflected ultrasonic waves.

Arm/Disarm Control—Composed of a keyboard and a locking circuit it arms or disarms the alarm system when the proper code is received.

PLC Chip—The National Semiconductor Corporation LM1893 power line carrier chip incorporates many complex internal circuits and employs various data transmission techniques. The circuits and data transmission techniques include: frequency shift keying, a Norton input limiter amplifier, a current controlled oscillator, a phase lock loop demodulator, an output amplifier, various filters, a modulator, a sine shaper, a time domain filter and an offset cancel circuit.

Microprocessor—An example of microprocessor which could accomplish many of the operations being carried out by the other components in the described circuit is the National Semiconductor COP420 microcontroller. This chip includes both ROM program memory and RAM data memory as well as an instruction set.

I claim:

1. In an alarm system, the combination that comprises:
    (a) first means to be placed in a room and to
        (i) transmit ultrasonic wave signals that rebound off the room's walls and contents, and
        (ii) receive the rebounding ultrasonic signals,
    (b) circuit means to phase balance the transmitted and received signals; to detect a subsequently unbalanced condition caused by a change in the rebounding signals due to intrusion activity; and to produce an electrical alarm signal in response thereto,
    (c) and other means responsive to reception of the alarm signal to produce an audible or visible alarm, said other means being coupled to said circuit means for receiving the alarm signal via coupling transformer means coupled to electrical power line means,
    (d) said first means including portable housing means carrying transmit and receive transducer means, said circuit means being associated with said first means and electrically connected with said transducer means, and said circuit means including an electrical connector having terminals to be electrically connected to terminals of an electrical connector associated with said power line means, a phase locked loop circuit to provide phase balancing, and a microprocessor electrically connected between said phase locked loop circuit and said first mentioned electrical connector to transmit digital alarm data to the power line means in response to activation by said circuit means.

2. The combination of claim 1 wherein said connectors respectively include household plug and receptacle elements.

3. The combination of claim 1 wherein said other means includes
   (d) portable housing means carrying an audible or visible alarm generator, and circuitry associated therewith including an electrical connector having terminals to be electrically connected to terminals of an electrical connector associated with said power line means.

4. The combination of claim 3 wherein said connectors respectively include household plug and receptacle means.

5. In an alarm system, the combination that comprises:
   (a) first means to be placed in a room, and to
      (i) transmit ultrasonic wave signals that rebound off the room's walls and contents, and
      (ii) receive the rebounding ultrasonic signals,
   (b) circuit means to phase balance the transmitted and received signals; to detect a subsequently unbalanced condition caused by a change in the rebounding signals due to intrusion activity; and to produce an electrical alarm signal in response thereto,
   (c) and other means response to reception of the alarm signal to produce an audible or visible alarm, said other means coupled to said circuit means for receiving the alarm signal via coupling transformer means coupled to electrical power line means,
   (d) said first means including housing means carrying transmit and receive transducer means, said circuit means being associated with said first means and electrically connected with aid transducer means, and said circuit means including an electrical connector having terminals to be electrically connected to terminals of an electrical connector associated with said power line means,
   (e) said circuit means including a phase locked loop circuit to provide phase balancing, an integrator circuit responsive to the output of the phase locked loop circuit, a threshold control circuit responsive to the output of the integer circuit, and a timer/control circuit responsive to the output of the threshold control circuit to effect transmission of an alarm signal to the power lines.

6. The combination of claim 5 wherein said circuit means also includes a shift register to transmit digital alarm data to the power lines in response to activation by the timer control circuit.

7. The combination of claim 6 including adjustable digital code generation means connected to the shift register to enable selection of an alarm code to be transmitted.

8. The combination of claim 5 wherein said circuit means includes a microprocessor to transmit digital alarm data to the power lines in response to activation by the timer control circuit.

9. The combination of claim 8, including a memory circuit electrically connected with said microprocessor.

10. The combination of claim 5 including an arm/disarm control circuit electrically connected with said timer controller.

11. In an alarm circuit, the combination that comprises:
   (a) first means to be placed in a room, and to
      (i) transmit ultrasonic wave signals that rebound off the room's walls and contents, and
      (ii) receive the rebounding ultrasonic signals,
   (b) circuit means to phase balance the transmitted and received signals; to detect a subsequently unbalanced condition caused by a change in the rebounding signals due to intrusion activity; and to produce an electrical alarm signal in response thereto,
   (c) and other means responsive to reception of the alarm signal to produce an audible or visible alarm, said other means being coupled to said circuit means for receiving the alarm signal via coupling transformer means coupled to electrical power line means,
   (d) said first means including portable housing means carrying transmit and receive transducer means, said circuit means being associated with said first means and electrically connected with said transducer means, and said circuit means including an electrical connector having terminals to be electrically connected to terminals of an electrical connector associated with said power line means, a phase locked loop circuit to provide phase balancing, and a microprocessor electrically connected between said phase locked loop circuit and said first mentioned electrical connector,
   (e) said other means including a siren, and a transceiver unit coupled between the siren and a coupling transformer coupled to power line means, a shift register coupled to the transceiver, a code generator, and a comparator coupled to the code generator and shift register, whereby if a signal match occurs in the comparator, a "safe condition" signal is transmitted to a timer/ controller circuit which prevents the siren from outputting an alarm signal.

* * * * *